A. W. NELSON.
TRACTION MEANS FOR AUTOMOBILES.
APPLICATION FILED SEPT. 30, 1920.

1,406,212.    Patented Feb. 14, 1922.

INVENTOR.
August W. Nelson
BY
L. L. Westfall
ATTORNEY.

UNITED STATES PATENT OFFICE.

AUGUST W. NELSON, OF SPOKANE, WASHINGTON.

TRACTION MEANS FOR AUTOMOBILES.

1,406,312.  Specification of Letters Patent.  Patented Feb. 14, 1922.

Application filed September 30, 1920. Serial No. 413,783.

*To all whom it may concern:*

Be it known that AUGUST W. NELSON, a citizen of the United States of America, residing at Spokane, in the county of Spokane, State of Washington, has invented new and useful Improvements in Traction Means for Automobiles, of which the following is a specification.

This invention pertains to traction means for automobiles and has for its object, to provide an improved means for giving traction to automobiles, trucks and other motor driven vehicles using pneumatic or solid rubber tires, to be used as an assistance in tracking the vehicle on a slippery road or pavement and giving added traction to the wheels when traveling through sand, mud and the like.

A special object of the invention is to provide such means without engaging the surface of the tires in order that no injury may be done to the tires thereby.

The device consists of a plurality of radiating prongs reaching outwardly with their outward ends reaching to a point substantially opposite the outer edge of the tires and having resilient supports whereby when the outer ends of the prongs come in contact with a hard surface in the rotation of the vehicle wheels, the prongs will give inwardly instead of binding or breaking.

Figures 1, 2:
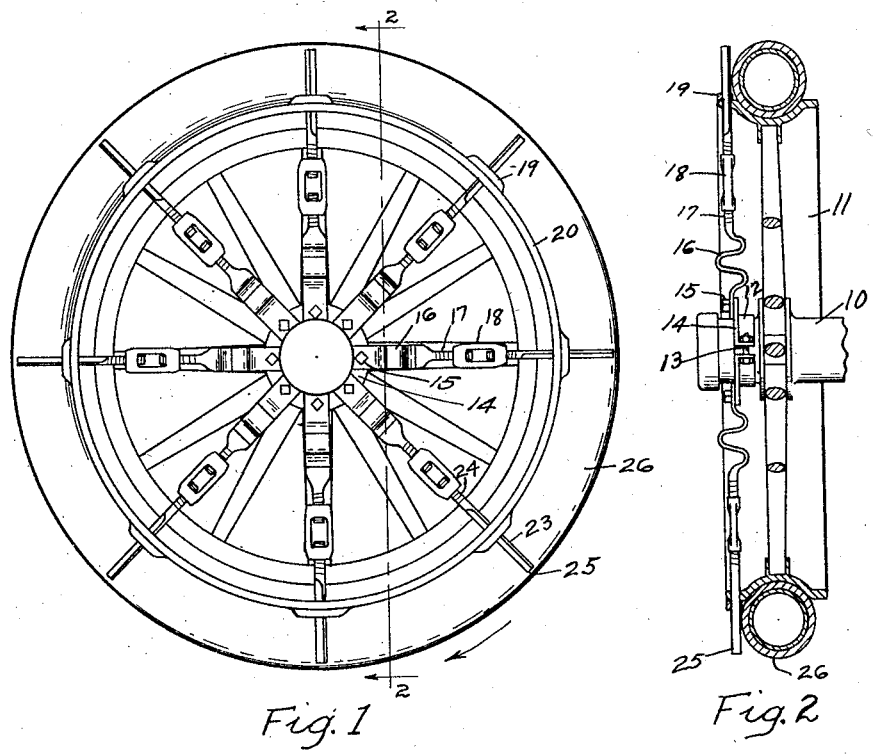
Figure 3:
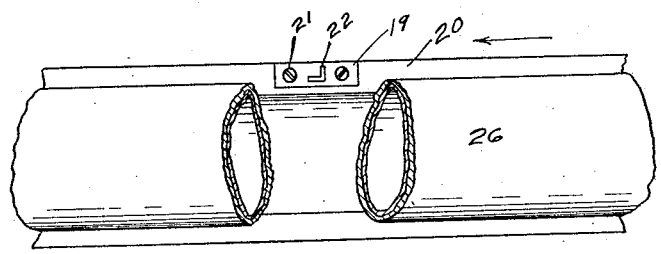

The construction and operation will be hereinafter described in detail, set out in the claims and illustrated in the accompanying drawings in which Figure 1 is a side elevation of a truck wheel with my improved device attached; Figure 2 is a sectional view taken on the line 2—2 of Figure 1 and Figure 3 is a broken away top plan view of a truck wheel with the prongs removed.

In a detail description, in which like numerals refer to like parts throughout the several views, to the hub 10 of the wheel 11 is secured, as by a clamp 12, tightened and held in place by a bolt 13, a flange 14, to which is secured, as by bolts 15, leaf springs 16, with their ends 17 threaded into a turn buckle 18. Plates 19, are secured to the outer edge of the periphery of the wheel rim 20, as by screws 21. An angular opening 22, is then provided through the periphery of the rim 20 and through the plates 19, angular prongs 23 of a form and size to fit the openings 22 are slidably mounted therein and have their inner ends 24, threaded into the turn buckle 18. The outer ends 25, of the prongs extend to a point substantially in alignment with the outer surface of the tire 26. By means of the turn buckle 18 the prongs 23 are adjustable to have their outer ends 25 extended to the proper or desirable position and also permits of the adjustment of the device to different size wheels. With the L shaped prongs 25 adjusted as shown in the drawings, it is assumed that the wheel will rotate in the direction of the arrows as the greater traction is obtained thereby.

The L shaped prongs give traction as against both longitudinal and sidewise skidding.

What is claimed is:—

1. Traction means for motor driven vehicles comprising prongs extending outwardly through the periphery of the wheels and adjacent the tires thereon, and connected with the hubs of the wheels and having resilient means consisting of a sinuous leaf spring between the outer ends of the prongs and the hubs.

2. Traction means for motor driven vehicles comprising L shaped prongs slidably adjusted through openings in the periphery of the wheels, resilient portions consisting of a tension spring connected with the inner ends of the prongs and the inner ends of the said resilient portions connected with the hubs of the wheels.

3. Traction means for motor driven vehicles comprising prongs slidably adjusted through openings in the periphery of the wheels strengthening plates attached to such periphery at such openings, resilient portions connected with the inner ends of the prongs, an annular flange attached to the hub of the wheel and the inner ends of the resilient portions connected with said flange.

In testimony whereof, I affix my signature in presence of a witness.

AUGUST W. NELSON.

Witness:

L. L. WESTFALL.